(12) United States Patent
Rothman et al.

(10) Patent No.: US 7,222,339 B2
(45) Date of Patent: May 22, 2007

(54) METHOD FOR DISTRIBUTED UPDATE OF FIRMWARE ACROSS A CLUSTERED PLATFORM INFRASTRUCTURE

(75) Inventors: Michael A. Rothman, Gig Harbor, WA (US); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 760 days.

(21) Appl. No.: 10/460,922

(22) Filed: Jun. 13, 2003

(65) Prior Publication Data
US 2004/0255286 A1    Dec. 16, 2004

(51) Int. Cl.
*G06F 9/44* (2006.01)
*G06F 9/445* (2006.01)

(52) U.S. Cl. .................. 717/168; 717/171; 717/176
(58) Field of Classification Search ........ 717/168–174, 717/175–178; 709/203
See application file for complete search history.

(56) References Cited

U.S. PATENT DOCUMENTS

| | | | |
|---|---|---|---|
| 6,467,087 B1* | 10/2002 | Yang ........................... | 717/168 |
| 6,640,334 B1* | 10/2003 | Rasmussen ................. | 717/171 |
| 6,643,843 B1* | 11/2003 | Reger ......................... | 717/168 |
| 6,678,888 B1* | 1/2004 | Sakanishi ................... | 717/172 |
| 6,754,895 B1* | 6/2004 | Bartel et al. ................ | 717/171 |
| 6,772,192 B1* | 8/2004 | Fulton et al. ............... | 709/203 |
| 6,874,143 B1* | 3/2005 | Murray et al. .............. | 717/173 |
| 6,915,513 B2* | 7/2005 | Duesterwald et al. ....... | 717/168 |
| 6,928,108 B2* | 8/2005 | Nelson et al. .............. | 375/222 |
| 6,954,929 B2* | 10/2005 | Erickson et al. ............ | 717/173 |

(Continued)

OTHER PUBLICATIONS

Stoyle et al, "Mutatis Mutandis Safe and predictable dyanmic software updating", ACM POPL pp. 183-194, 2005.*
Erwig et al, "A rule based language for programming software updates", ACM SIGPLAN, pp. 67-77, 2002.*
Pridgen et al, "A secure modular mobile agent system", ACM SELMAS, pp. 67-73, 2006.*
Platen et al, "Feedback linking optimizing object code layout for updates", ACM LCTES, pp. 2-11, 2006.*

*Primary Examiner*—Anil Khatri
(74) *Attorney, Agent, or Firm*—Blakely, Sokoloff, Taylor & Zafman LLP (57) ABSTRACT

Methods, apparatus, and systems for updating firmware for clustered computing platforms. Firmware provided on each platform is loaded for operating system runtime availability. The firmware update process begins by issuing an update directive that includes firmware update data to a first platform. That platform then interacts with firmware running on other platforms to update the firmware for those platforms, wherein communications between the platforms is enabled via an out-of-band (OOB) communication channel or network. In one embodiment, OOB communications are facilitated by a hidden execution mode known as the System Management Mode (SMM), which has the ability to receive and respond to periodic System Management Interrupts (SMI) and execute corresponding SMI handlers configured to support inter-platform communication in a manner that is transparent to operating systems running on the platforms. The method allows firmware to be updated across multiple platforms, such as server blades, using a single administrative action.

28 Claims, 7 Drawing Sheets

U.S. PATENT DOCUMENTS

| | | | |
|---|---|---|---|
| 6,996,817 B2* | 2/2006 | Birum et al. | 717/170 |
| 7,000,230 B1* | 2/2006 | Murray et al. | 717/172 |
| 7,058,797 B2* | 6/2006 | Miyamoto et al. | 713/1 |
| 7,069,294 B2* | 6/2006 | Clough et al. | 709/203 |
| 7,069,551 B2* | 6/2006 | Fong et al. | 717/171 |
| 7,082,509 B2* | 7/2006 | Zimmer et al. | 711/170 |
| 7,082,523 B2* | 7/2006 | Zimmer et al. | 713/1 |
| 7,107,440 B2* | 9/2006 | Rothman et al. | 713/1 |

* cited by examiner

METHOD FOR DISTRIBUTED UPDATE OF FIRMWARE ACROSS A CLUSTERED PLATFORM INFRASTRUCTURE

FIELD OF THE INVENTION

The field of invention relates generally to clustered computing environments, and, more specifically but not exclusively relates to techniques for updating firmware for clustered computing platforms in a coordinated manner.

BACKGROUND INFORMATION

Information Technology (IT) managers and Chief Information Officers (CIOs) are under tremendous pressure to reduce capital and operating expenses without decreasing capacity. The pressure is driving IT management to provide computing resources that more efficiently utilize all infrastructure resources. To meet this objective, aspects of the following questions are often addressed: How to better manage server utilization; how to cope with smaller IT staff levels; how to better utilize floor space; and how to handle power issues.

Typically, a company's IT infrastructure is centered around computer servers that are linked together via various types of networks, such as private local area networks (LANs) and private and public wide area networks (WANs). The servers are used to deploy various applications and to manage data storage and transactional processes. Generally, these servers will include stand-alone servers and/or higher density rack-mounted servers, such as 2U and 1U servers.

Recently, a new server configuration has been introduced that provides unprecedented server density and economic scalability. This server configuration is known as a "blade server." A blade server employs a plurality of closely-spaced "server blades" (blades) disposed in a common chassis to deliver high-density computing functionality. Each blade provides a complete computing platform, including one or more processors, memory, network connection, and disk storage integrated on a single system board. Meanwhile, other components, such as power supplies and fans, are shared among the blades in a given chassis and/or rack. This provides a significant reduction in capital equipment costs when compared to conventional rack-mounted servers.

Generally, blade servers are targeted towards two markets: high density server environments under which individual blades handle independent tasks, such as web hosting; and scaled computer cluster environments. A scalable compute cluster (SCC) is a group of two or more computer systems, also known as compute nodes, configured to work together to perform computational-intensive tasks. By configuring multiple nodes to work together to perform a computational task, the task can be completed much more quickly than if a single system performed the tasks. In theory, the more nodes that are applied to a task, the quicker the task can be completed. In reality, the number of nodes that can effectively be used to complete the task is dependent on the application used.

A typical SCC is built using Intel®-based servers running the Linux operating system and cluster infrastructure software. These servers are often referred to as commodity off the shelf (COTS) servers. They are connected through a network to form the cluster. An SCC normally needs anywhere from tens to hundreds of servers to be effective at performing computational-intensive tasks. Fulfilling this need to group a large number of servers in one location to form a cluster is a perfect fit for a blade server. The blade server chassis design and architecture provides the ability to place a massive amount of computer horsepower in a single location. Furthermore, the built-in networking and switching capabilities of the blade server architecture enables individual blades to be added or removed, enabling optimal scaling for a given task. With such flexibility, blade server-based SCC's provides a cost-effective alternative to other infrastructures for performing computational tasks, such as supercomputers.

Under current architectures, there is no scheme that enables efficient firmware updates for clustered computer infrastructures, such as blade server environments. As discussed above, each blade in a blade server is enabled to provide full platform functionality, thus being able to operate independent of other blades in the server. Within this context, each server blade employs its own firmware for performing initialization operations and providing operating system (OS) run-time support for accessing various platform hardware and peripheral devices. Accordingly, in order to update firmware for multiple blade servers, it is necessary to perform an update process on each individual blade. When considering that a single rack may hold upwards of 300 server blades, it is readily apparent that updating firmware for blade servers is very time consuming and expensive.

Firmware can be updated in one of two manners. If the firmware is stored on a read-only (i.e., non-writable) device, such as a conventional ROM (read-only memory), the only way to update the firmware is to replace the firmware storage device. This technique is highly disfavored for most end users, as well as vendors, since it requires someone to replace one or more ROM chips on a motherboard or option ROM chips on an add-in card. System firmware may also be updated during operating system "runtime" operations, that is, while the computer is running subsequent to an OS boot. Traditionally, runtime firmware updating has required direct hardware access and special OS-specific device/component/platform support. This typically requires that the OEM (original equipment manufacturer) or IHV (independent hardware vendor) write an update driver for every operating system target for use by the corresponding system device, component, or platform. Furthermore, the update driver usually must be included as part of the set of drivers that may be used under a given operation system, creating a headache for both the OEM/IHV and the OS vendor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1b is a rear isometric view of the blade server chassis of FIG. 1a;

DETAILED DESCRIPTION OF PREFERRED EMBODIMENTS

Embodiments of methods and computer components and systems for performing firmware updates in a clustered platform environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, techniques are disclosed herein for updating firmware in clustered computing platform infrastructures, such as blade server environments, in a manner under which an administrator only needs to perform a single update process, regardless of the number of individual platforms that are updated. The techniques employ firmware-based functionality that provides management of the firmware update without having any commensurate OS complicity. As such, the process may be performed in the same manner regardless of the operating system deployed on the platforms.

To illustrate principles and teachings of the invention, embodiments are discussed below in the context of a blade server environment. As an overview, typical blade server components and systems are shown in FIGS. 1a–c, and 2. Under a typical configuration, a rack-mounted chassis 100 is employed to provide power and communication functions for a plurality of server blades (i.e., blades) 102, each of which occupies a corresponding slot. (It is noted that all slots in a chassis do not need to be occupied.) In turn, one or more chassis 100 may be installed in a blade server rack 103 shown in FIG. 1c. Each blade is coupled to an interface plane 104 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 1A:
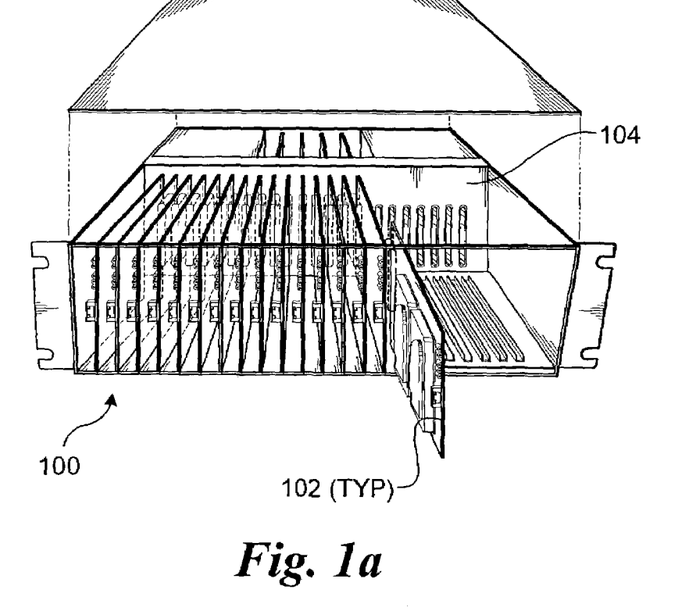
FIG. 1a is a frontal isometric view of an exemplary blade server chassis in which a plurality of server blades are installed.
Figure 1B:
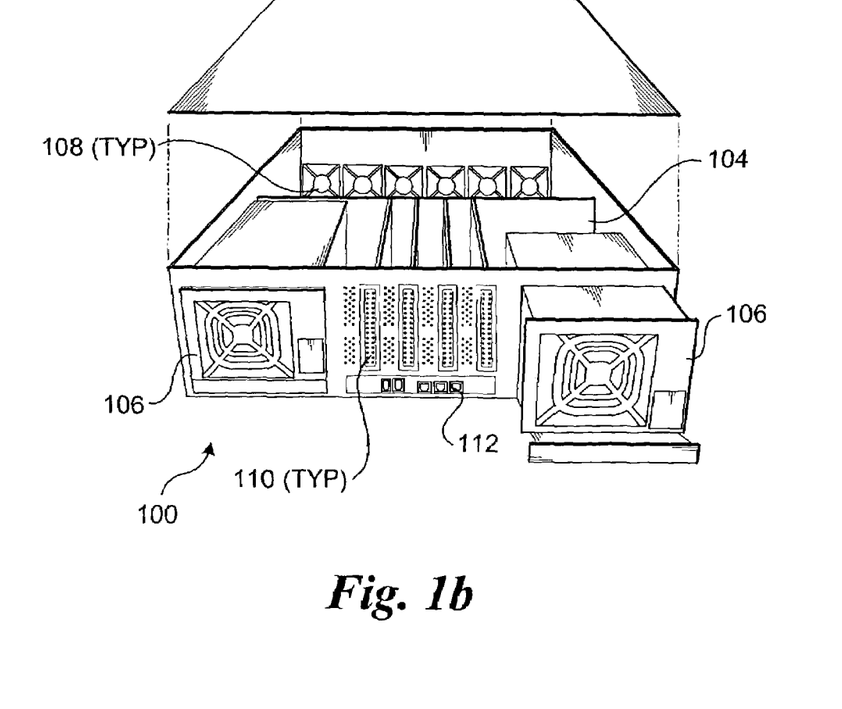
Figure 1C:
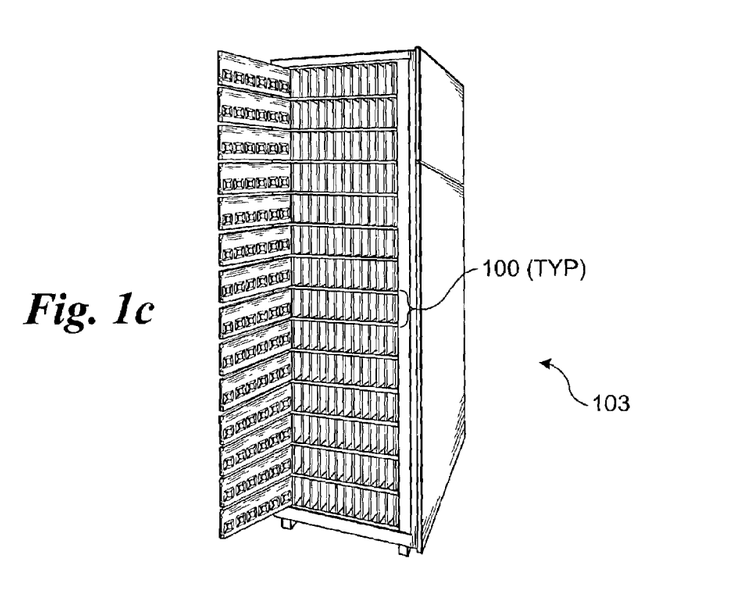
FIG. 1c is an isometric frontal view of a exemplary blade server rack in which a plurality of rack-mounted blade server chassis corresponding to FIGS. 1a and 1b are installed.

A typical mid-plane interface plane configuration is shown in FIGS. 1a and 1b. The backside of interface plane 104 is coupled to one or more power supplies 106. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 108 are employed to draw air through the chassis to cool the server blades.

An important feature required of all blade servers is the ability to communication externally with other IT infrastructure. This is typically facilitated via one or more network connect cards 110, each of which is coupled to interface plane 104. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 112 that is coupled to the backside or frontside of the interface plane. As yet another option, a management or configuration server may be employed to manage blade activities, wherein communications are handled via standard computer networking infrastructure, for example, Ethernet.

Figure 2:
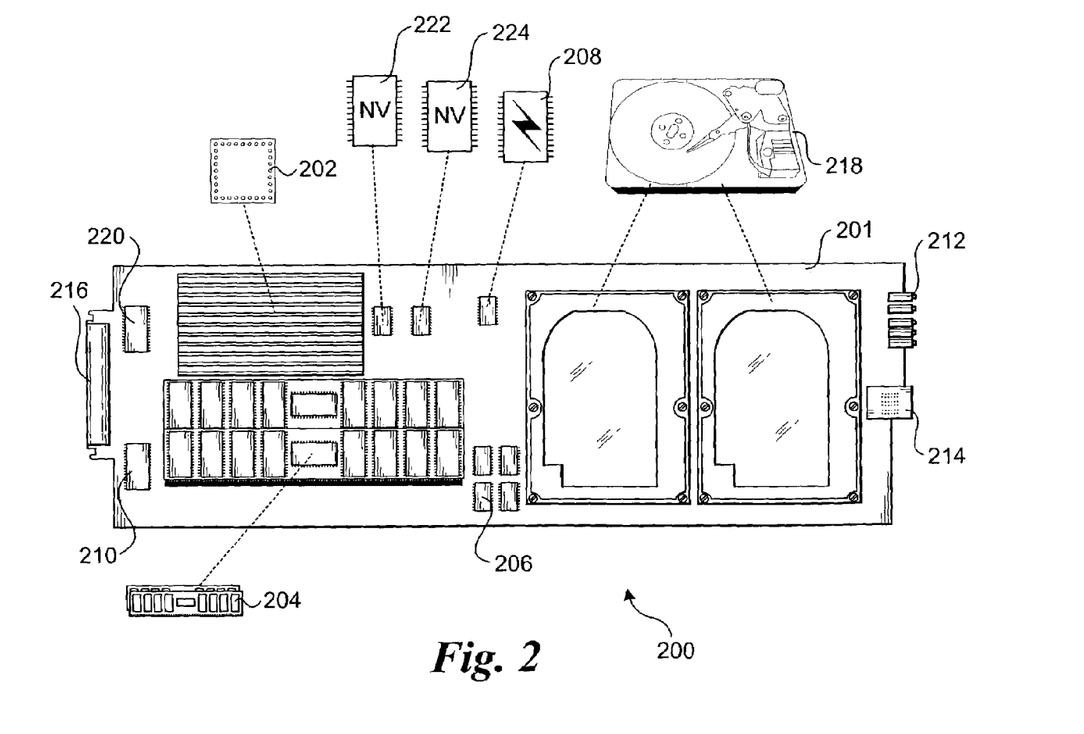
FIG. 2 shows details of the components of a typical server blade.

With reference to FIG. 2, further details of an exemplary blade 200 are shown. As discussed above, each blade comprises a separate computing platform that is configured to perform server-type functions, i.e., is a "server on a card." Accordingly, each blade includes components common to conventional servers, including a main printed circuit board (main board) 201 providing internal wiring (i.e., buses) for coupling appropriate integrated circuits (ICs) and other components mounted to the board. These components include one or more processors 202 coupled to system memory 204 (e.g., DDR (double data rate) RAM), cache memory 206 (e.g., SDRAM), and a firmware storage device 208 (e.g., flash memory). A "public" NIC (network interface controller) chip 210 is provided for supporting conventional network communication functions, such as to support communication between a blade and external network infrastructure. Other illustrated components include status LED (light-emitting diodes) 212, an RJ-45 console port 214, and an interface plane connector 216. Additional components include various passive components (i.e., resistors, capacitors), power conditioning components, and peripheral device connectors.

Generally, each blade 200 will also provide on-board storage. This is typically facilitated via one or more built-in disk controllers and corresponding connectors to which one or more disk drives 218 are coupled. For example, typical disk controllers include Ultra ATA controllers, SCSI controllers, and the like. As an option, the disk drives may be housed separate from the blades in the same or a separate rack, such as might be the case when a network-attached storage (NAS) appliance is employed for storing large volumes of data.

In accordance with aspects of the invention, facilities are provided for out-of-band communication between blades, and optionally, dedicated management components. As used herein, an out-of-band (OOB) communication channel comprises a communication means that supports communication between devices in an OS-transparent manner—that is, a means to enable inter-blade communication without requiring operating system complicity. Generally, various approaches may be employed to provide the OOB channel. These include, but are not limited to, using a dedicated bus, such as a system management bus that implements the SMBUS standard (www.smbus.org), a dedicated private or management network, such as an Ethernet-based network using IEEE VLAN-802.1Q, or a serial communication scheme, e.g., employing the RS-485 serial communication standard. One or more appropriate IC's for supporting such communication functions are also mounted to main board 201, as depicted by an OOB channel chip 220. At the same time, interface plane 104 will include corresponding buses or built-in network traces to support the selected OOB scheme. Optionally, in the case of a wired network scheme (e.g., Ethernet), appropriate network cabling and networking devices may be deployed inside or external to chassis 100.

As discussed above, the platform firmware is stored in firmware device 208. In modern computer systems, firmware devices typically comprise a rewritable non-volatile memory component, such as, but not limited to, a flash device or EEPROM chip. As used herein, these devices are termed "non-volatile (NV) rewritable memory devices." In general, NV rewritable memory devices pertain to any device that can store data in a non-volatile manner (i.e., maintain data when the computer system is not operating), and provides both read and write access to the data. Thus, all or a portion of firmware stored on an NV rewritable memory device may be updated by rewriting data to appropriate memory ranges defined for the device.

In addition to the platform firmware stored in firmware device 208, additional firmware may also be stored in other NV rewritable memory devices. For example, firmware corresponding to the operation of management card 112 (with respect to blade-side operations) may be provided. Exemplary devices for storing such additional firmware are depicted as NV rewritable memory devices 222 and 224.

In accordance with further aspects of the invention, a framework is now discussed that provides a standardized mechanism to enable system firmware to be updated. The framework supports a PULL model that enables firmware components to effect an update, while a framework API (application program interface) is used to engender the update. It also enables firmware updates in the OS space without the need for an OS-specific driver that have traditionally been needed for direct hardware access. Furthermore, the framework API provides an abstracted interface that supports firmware updates without requiring intimate knowledge of the firmware being updated.

In one embodiment, the firmware update framework may be implemented under an extensible firmware framework known as Extensible Firmware Interface (EFI) (specifications and examples of which may be found at http://developer.intel.com/technology/efi). EFI is a public industry specification (current version 1.10 released Jan. 7, 2003) that describes an abstract programmatic interface between platform firmware and shrink-wrap operation systems or other custom application environments. The EFI framework include provisions for extending BIOS (Basic Input Output System) functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

Figure 3:
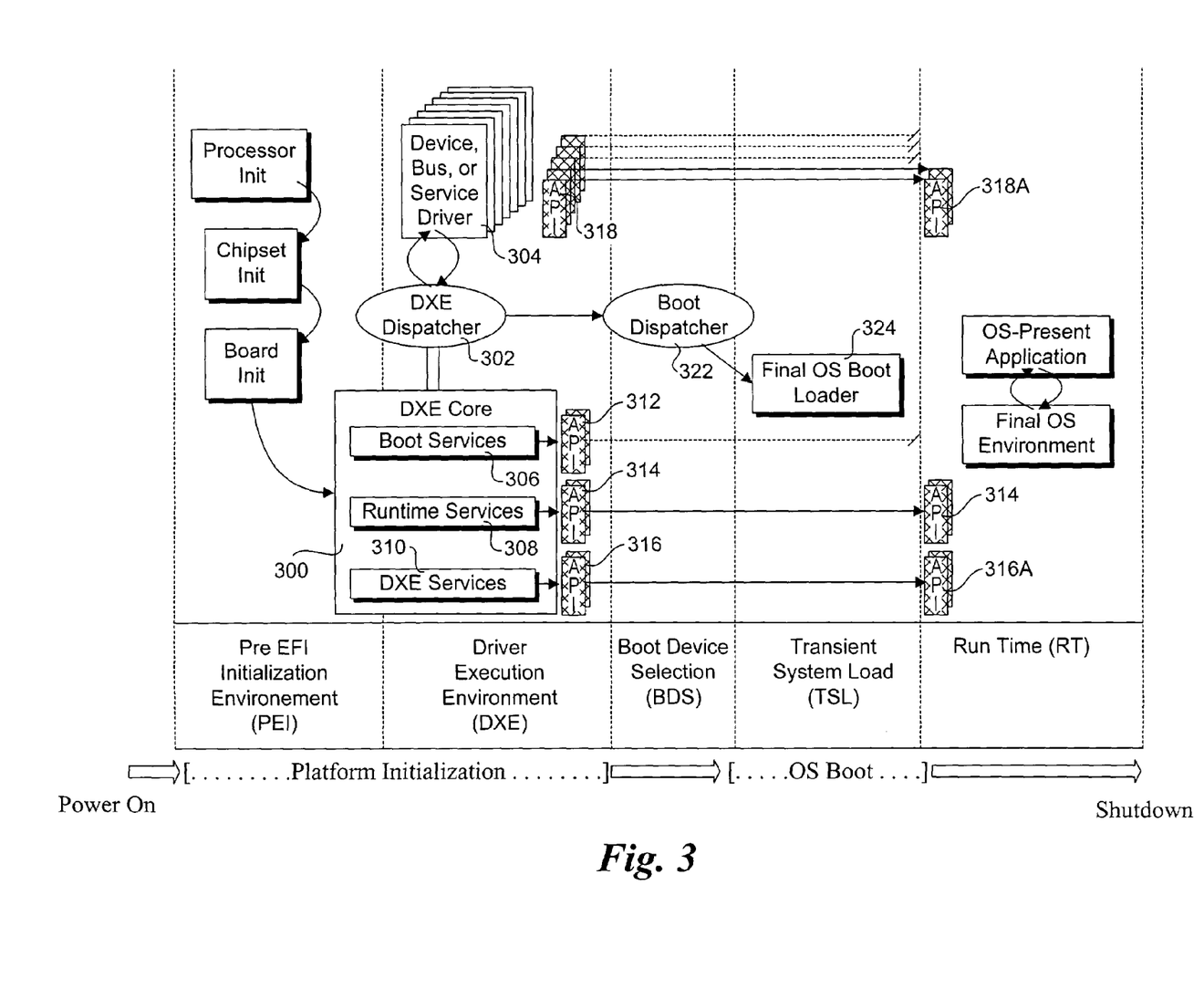
FIG. 3 is a schematic diagram illustrating the various execution phases that are performed in accordance with the extensible firmware interface (EFI) framework.

FIG. 3 shows an event sequence/architecture diagram used to illustrate operations performed by a platform under the framework in response to a cold boot (e.g., a power off/on reset). The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. The phases build upon one another to provide an appropriate run-time environment for the OS and platform.

The PEI phase provides a standardized method of loading and invoking specific initial configuration routines for the processor, chipset, and motherboard. The PEI phase is responsible for initializing enough of the system to provide a stable base for the follow on phases. Initialization of the platform's core components, including the processor, chipset and main board (i.e., motherboard) is performed during the PEI phase. This phase is also referred to as the "early initialization" phase. Typical operations performed during this phase include the POST (power-on self test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including a DXE core 300, a DXE dispatcher 302, and a set of DXE drivers 304. The DXE core 300 produces a set of Boot Services 306, Runtime Services 308, and DXE Services 310. The DXE dispatcher 302 is responsible for discovering and executing DXE drivers 304 in the correct order. The DXE drivers 304 are responsible for initializing the processor, chipset, and platform components as well as providing software abstractions for console and boot devices. These components work together to initialize the platform and provide the services required to boot an operating system. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully formed EFI interface.

The DXE core 300 is designed to be completely portable with no processor, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard coded addresses. This means that the DXE core can be loaded anywhere in physical memory, and it can function correctly no matter where physical memory or where Firmware segments are located in the processor's physical address space. Third, the DXE core does not contain any processor-specific, chipset specific, or platform specific information. Instead, the DXE core is abstracted from the system hardware through a set of architectural protocol interfaces. These architectural protocol interfaces are produced by DXE drivers 304, which are invoked by DXE Dispatcher 302.

Figure 4:
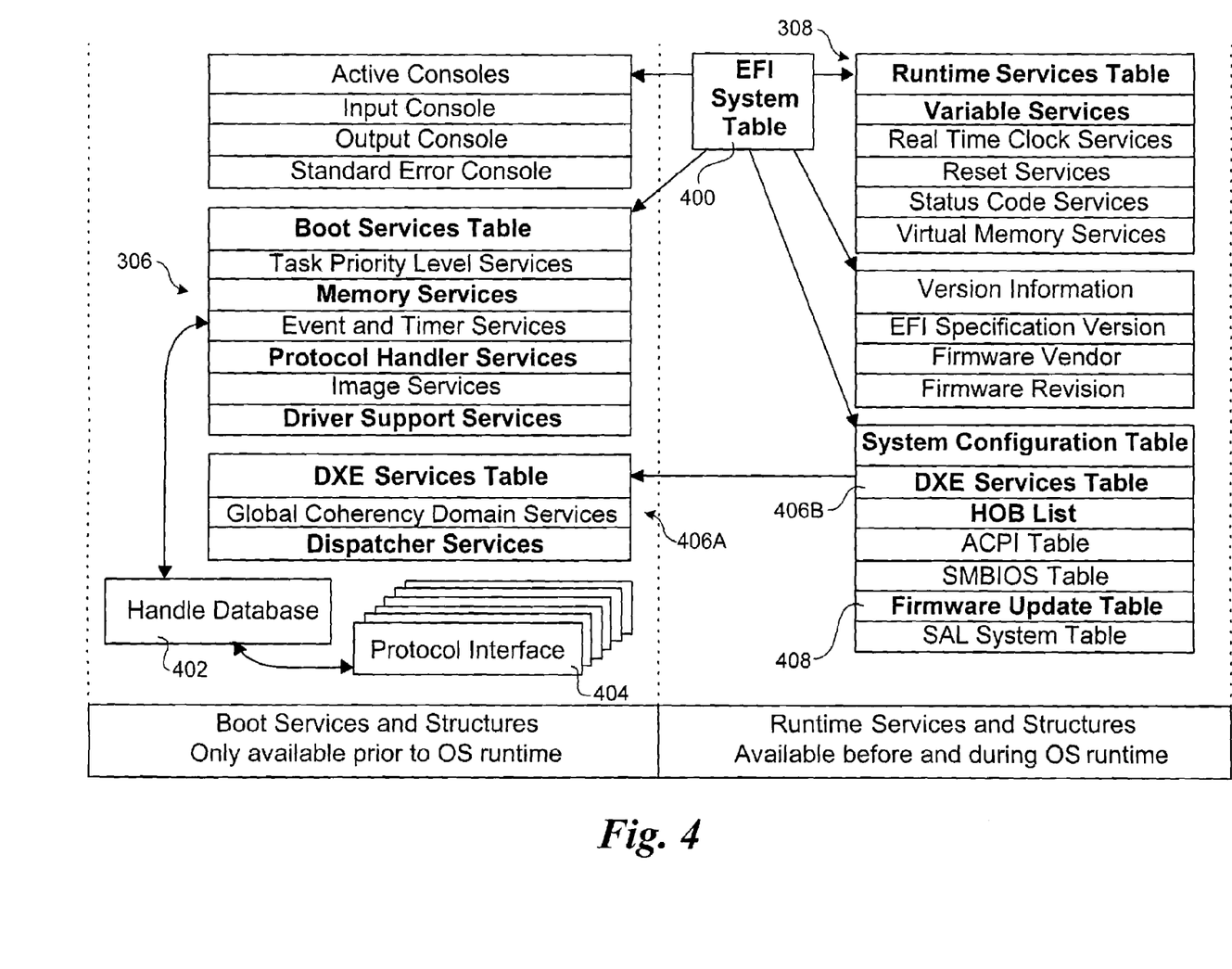
FIG. 4 is a block schematic diagram illustrating various components of the EFI system table that are employed by embodiments of the invention during a firmware update process.

The DXE core 300 produces an EFI System Table 400 and its associated set of Boot Services 306 and Runtime Services 308, as shown in FIG. 4. The DXE core also maintains a handle database 402. The handle database comprises a list of one or more handles, wherein a handle is a list of one or more unique protocol GUIDs (Globally Unique Identifiers) that map to respective protocols 404. A protocol is a software abstraction for a set of services. Some protocols abstract input/output (I/O) devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services 306 comprise a set of services that are used during the DXE and BDS phases. Among others, these services include Memory Services, Protocol Handler Services, and Driver Support Services. Memory Services provide services to allocate and free memory pages and allocate and free the memory pool on byte boundaries. It also provides a service to retrieve a map of all the current physical memory usage in the platform. Protocol Handler Services provide services to add and remove handles from the handle database. They also provide services to add and remove protocols from the handles in the handle database. Addition services are available that allow any component to lookup handles in the handle database, and open and close protocols in the handle database. Driver Support Services provide services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism).

In contrast to Boot Services 306, Runtime Services 308 are available both during pre-boot and OS runtime operations. One of the Runtime Services that is leveraged by embodiments disclosed herein is the Variable Services. As described in further detail below, the Variable Services provide services to lookup, add, and remove environmental variables from both volatile and non-volatile storage. As used herein, the Variable Services are termed "generic" since they are independent of any system component for which firmware is updated by embodiments of the invention.

The DXE Services Table includes data corresponding to a first set of DXE services 406A that are available during pre-boot only, and a second set of DXE services 406B that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 306, Runtime Services 308, and DXE services 310 are accessed via respective sets of API's 312, 314, and 316. The API's provide an abstracted interface that enables subsequently loaded components to leverage selected services provided by the DXE Core.

After DXE Core 300 is initialized, control is handed to DXE Dispatcher 302. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the DXE dispatcher 302 searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services.

The second class of DXE drivers are those that comply with the EFI 1.10 Driver Model. These drivers do not perform any hardware initialization when they are executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the EFI 1.10 Driver Model ultimately provide software abstractions for console devices and boot devices when they are explicitly asked to do so.

Any DXE driver may consume the Boot Services and Runtime Services to perform their functions. However, the early DXE drivers need to be aware that not all of these services may be available when they execute because all of the architectural protocols might not have been registered yet. DXE drivers must use dependency expressions to guarantee that the services and protocol interfaces they require are available before they are executed.

The DXE drivers that comply with the EFI 1.10 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the InstallConfigurationTable function. These published drivers are depicted by API's 318. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 320 is used during the BDS phase to enable selection of a Boot target, e.g., an OS to be booted by the system.

During the TSL phase, a final OS Boot loader 324 is run to load the selected OS. Once the OS has been loaded, there is no further need for the Boot Services 306, and for many of the services provided in connection with DXE drivers 304 via API's 318, as well as DXE Services 310. Accordingly, these reduced sets of API's that may be accessed during OS runtime are depicted as API's 316A, and 318A in FIG. 3.

The pre-boot/boot framework of FIG. 3 may be implemented to enable update of various firmware, including system firmware (i.e., firmware stored on main board 201) and add-in firmware (e.g., firmware associated with optional add-on components and peripheral devices, stored in NV rewritable memory devices 222 and 224). This is facilitated, in part, by API's published by respective components/devices during the DXE phase, and through use of the Variable Services runtime service.

Figure 6:
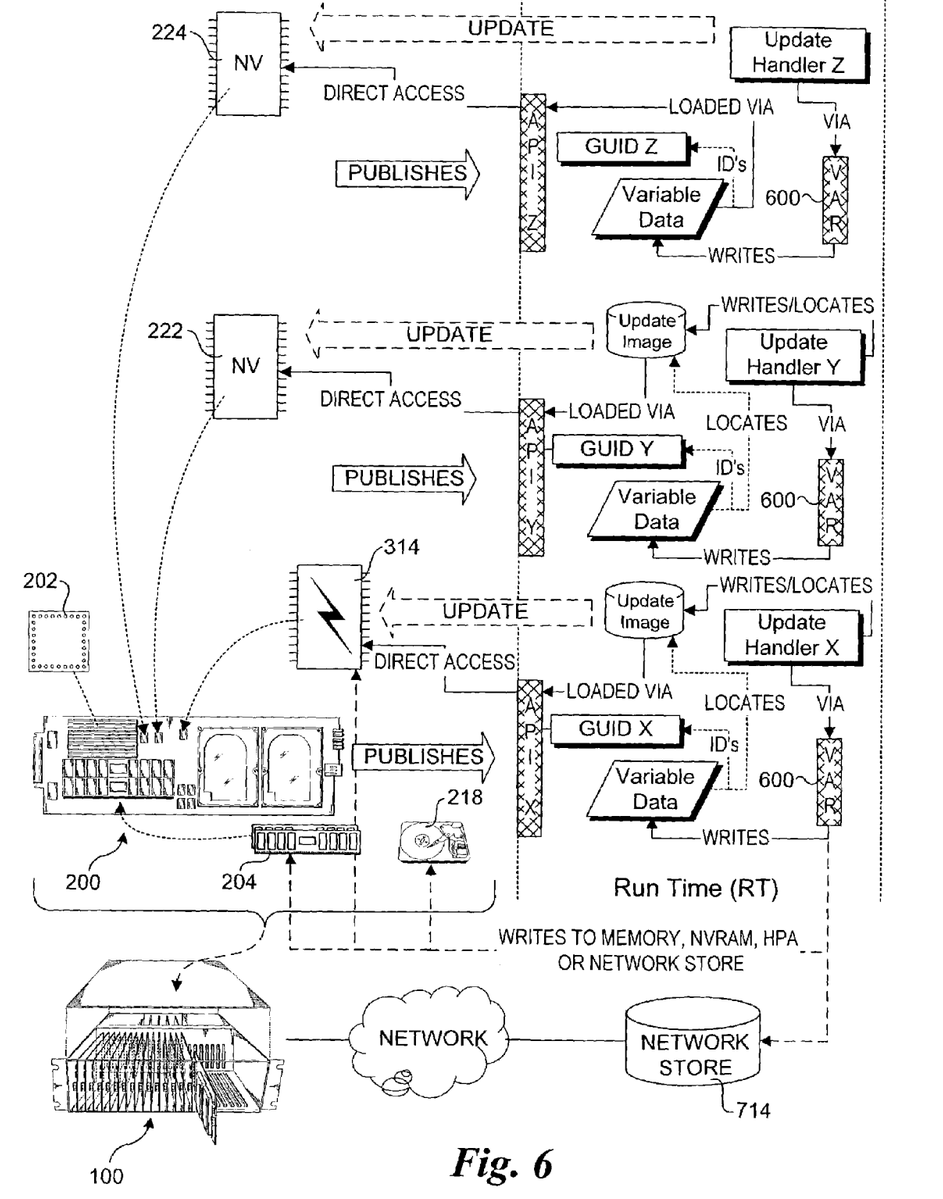
FIG. 6 is a schematic diagram illustrating various data flows that occur for a given server blade to facilitate the firmware upgrade process illustrated in the flowchart of FIG. 5.
Figure 7:
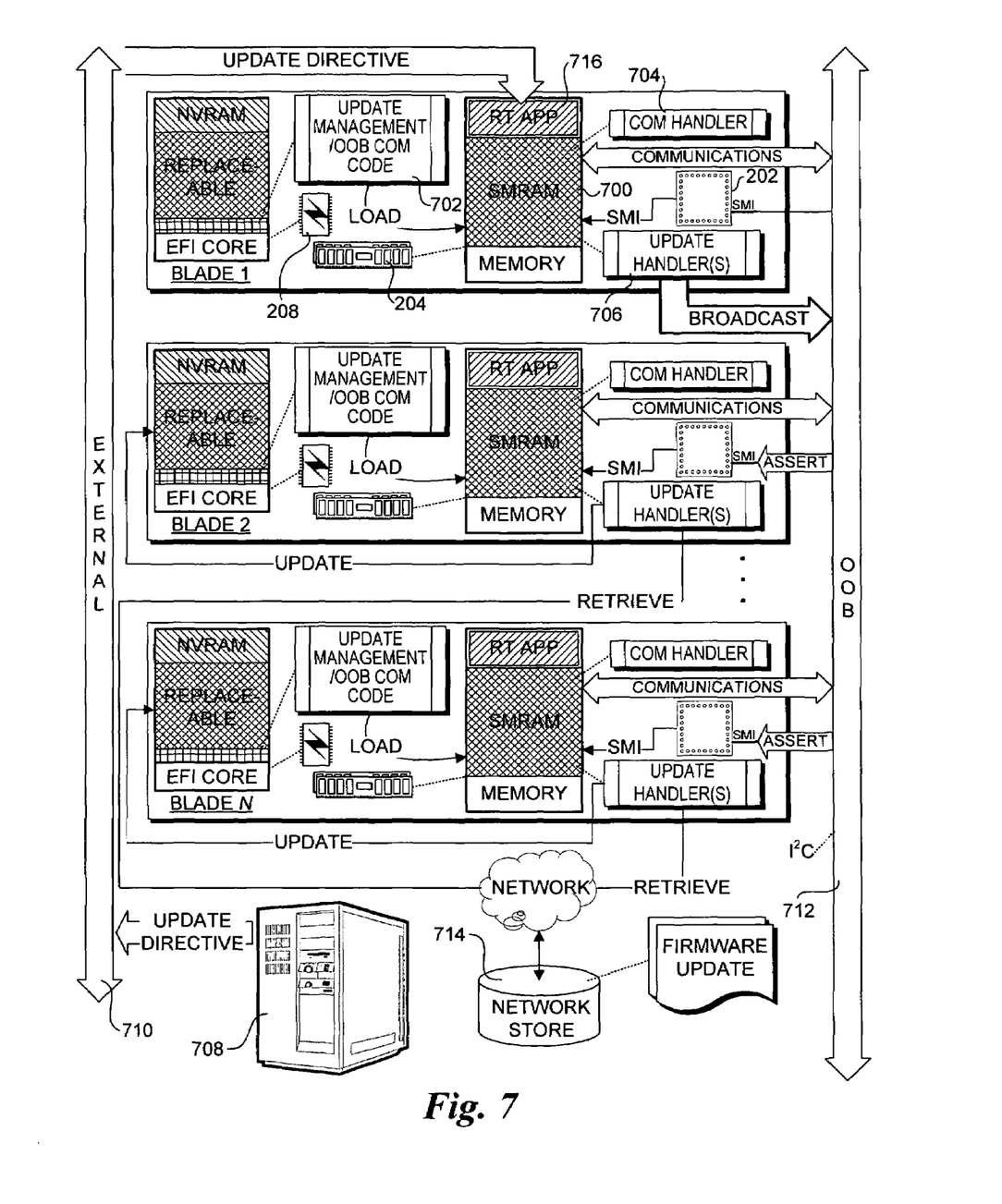
FIG. 7 is a schematic diagram illustrating various data flows that occur between multiple server blades during the firmware upgrade process illustrated in the flowchart of FIG. 5.

Under principles of the invention, firmware upgrades may be effectuated across multiple computing platforms, including groups of blades, individual chassis, racks, or groups of racks. During system initialization, firmware provided on each platform is loaded for operating system runtime availability. The process (from an administrators point of view) begins by providing a firmware update to a first server blade. That blade then interacts with firmware running on other blades to facilitate update of the firmware for those blades via corresponding variable data that are accessible via the Variable Services, wherein communications between the blades is facilitated via an out-of-band communication channel or network. Flowchart operations and logic according to one embodiment of the process are shown in FIG. 5, while corresponding operations and interactions between various components are schematically illustrated in FIGS. 6 and 7.

Figure 5:
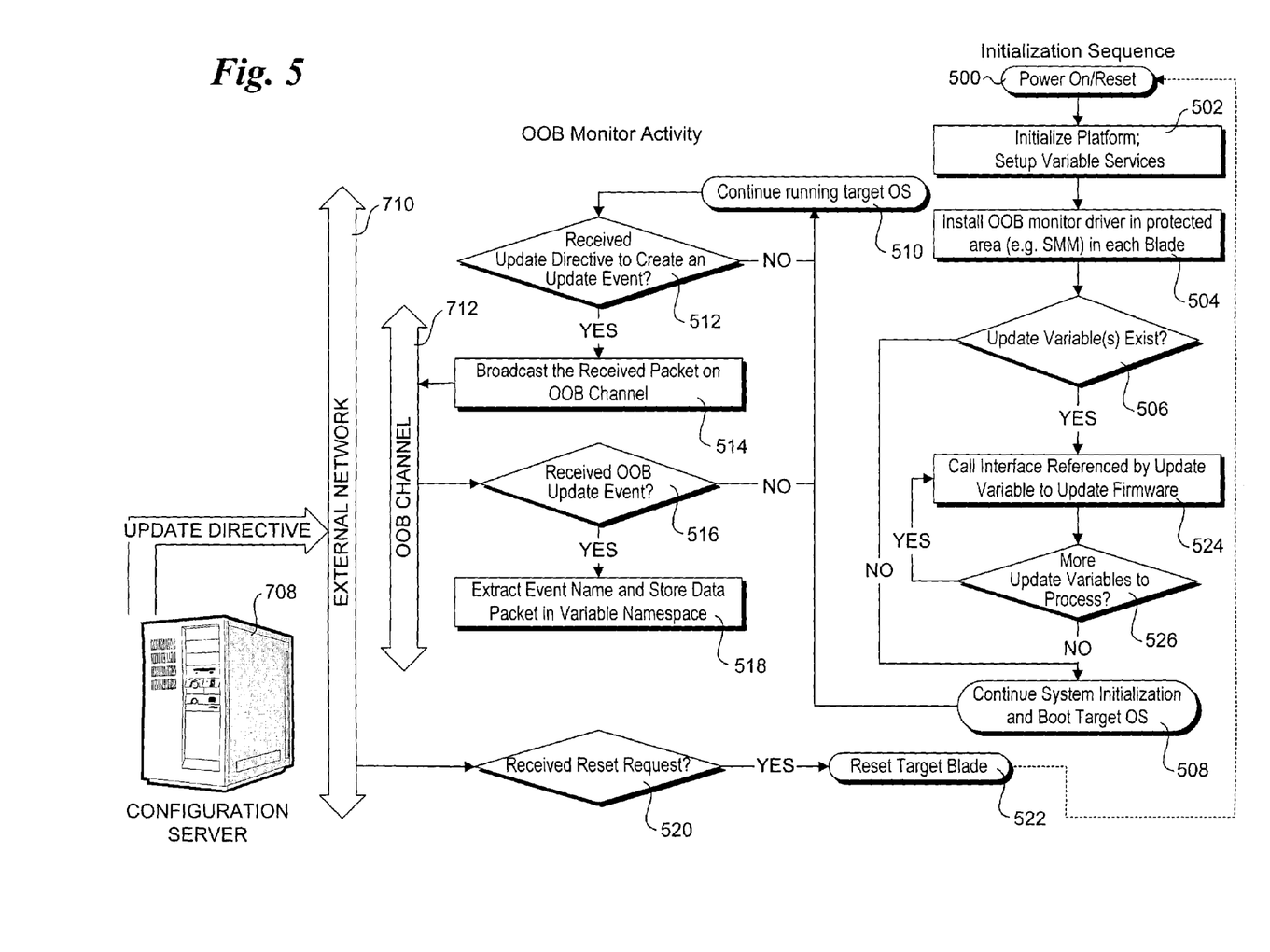
FIG. 5 is a flowchart illustrating operations and logic employed during a firmware update process in accordance with one embodiment of the invention.

With reference to FIG. 5, the process begins by performing several initialization operations on each blade to set up the Variable Services and the OOB communications framework. In response to a power on or reset event depicted in a start block 500, the system performs pre-boot system initialization operations in the manner discussed above with reference to FIG. 3. First, early initialization operations are performed in a block 502 by loading and executing firmware stored in each blade's boot firmware device (BFD). Under EFI, the BFD comprises the firmware device that stores firmware for booting the system; the BFD for server blade 200 comprises firmware device 208.

Continuing with block 502, processor 202 executes reset stub code that jumps execution to the base address of the BFD via a reset vector. The BFD contains firmware instructions that are logically divided into a boot block and an EFI core. The boot block contains firmware instructions for performing early initialization, and is executed by processor 202 to initialize the processor, chipset, and motherboard. (It is noted that during a warm boot (reset) early initialization is not performed, or is at least performed in a limited manner.) Execution of firmware instructions corresponding to the EFI core are executed next, leading to the DXE phase. During DXE core initialization, the Variable Services are setup in the manner discussed above with reference to FIGS. 3 and 4. After the DXE core is initialized, DXE dispatcher 302 begins loading DXE drivers 304. Each DXE driver corresponds to a system component, and provides an interface for directly accessing that component. Included in the DXE drivers is a driver that will be subsequently employed for updating firmware stored in a firmware device corresponding to the add-in component or platform for which the DXE driver is written. Loading of this driver causes a corresponding update API ("API X") to be published by the EFI framework, as shown in FIG. 6. In a similar manner, API's "Y" and "Z," respectively employed for accessing firmware stored on NV rewritable memory devices 222 and 224, are also published by the EFI framework.

Next, in a block 504, an OOB monitor driver is installed in a protected area in each blade. As discussed above, an out-of-band communication channel or network that operates independent of network communications that are managed by the operating systems is employed to facilitate inter-blade communication in an OS-transparent manner. In one embodiment, OOB communications are facilitated by a hidden execution mode known as the System Management Mode (SMM), which has the ability to receive and respond to periodic System Management Interrupts (SMI) and execute corresponding SMI handlers configured to support inter-blade communication.

During the foregoing system initialization operations of block 502, a portion of system memory 204 is setup to be employed for system management purposes. This portion of memory is referred to as system management RAM (SM-RAM) 700 (see FIG. 7), and is hidden from the subsequently loaded operating system.

In conjunction with the firmware load, SMM update management code and OOB communication code 702 stored in firmware is loaded into SMRAM, and SMM handlers for handling corresponding firmware updates and OOB communications (depicted as communications handler 704 and update handler 706) are setup. The handlers are a type of interrupt handler, and are invoked in response to a system management interrupt (SMI). In turn, an SMI interrupt may be asserted via an SMI pin on the system's processor. In response to an SMI interrupt, the processor stores its current context (i.e., information pertaining to current operations, including its current execution mode, stack and register information, etc.), and switches its execution mode to its system management mode. SMM handlers are then sequentially dispatched to determine if they are the appropriate handler for servicing the SMI event. This determination is made very early in the SMM handler code, such that there is little latency in determining which handler is appropriate. When this handler is identified, it is allowed to execute to completion to service the SMI event. After the SMI event is serviced, an RSM (resume) instruction is issued to return the processor to its previous execution mode using the previously saved context data. The net result is that SMM operation is completely transparent to the operating system.

Returning to the flowchart of FIG. 5, a determination is made in a decision block 506 as to whether one or more update variables exist. As described below, an update variable (or update variable data) is used to effectuate an update of firmware for a corresponding component or device. For simplicity, it will be assumed at this point in time that all blades are being initialized for the first time and that no update variables exist yet. Accordingly, the answer to decision block 506 is no, and the logic flows to a continuation block 508 in which the system initialization is continued and the target operating system is booted. Once the OS is booted, the logic proceeds to a continuation block 510 corresponding to continuing OS runtime operations.

As discussed above, update variables are used to effectuate firmware updates. However, in order to employ update variables for such purposes there needs to be a mechanisms for loading the update variables so they are accessible to each of the blades having firmware that is to be updated. In accordance with one embodiment, this process is facilitated by providing update variable data contained in a data packet that is broadcasted or otherwise distributed to each of the blades via the OOB channel. In one embodiment the broadcaster is one of the blades, which receives the data packet as part of an update directive. Generally, the update directive will be issued via some type of management facility, such as via a management console in conjunction with the use of management card 112, or via an external management server (depicted as configuration server 708 in FIGS. 5 and 7) that is coupled to the blades via an external network 710.

Generally, depending on the particularities of the implementation, the update directive may be provided to a selected blade with or without OS complicity. For example, in one embodiment, an operating system runtime application 716 running on a selected Blade 1 is used to facilitate the update process. Accordingly, the runtime application is employed to respond to an update directive. As such, in a decision block 512 the runtime application determines whether an update directive to create an update event has been received. Optionally, the update directive may be sent via the OOB channel (not shown), with an incoming communication trapped in the manner discussed below with respect to the operation of communication handler 704.

If an update directive has been received, the logic flows to a block 514 in which the received packet is broadcast (or otherwise distributed) to appropriate blades via OOB channel 712. Typically, the platform configurations for the blades within a given chassis will be similar. As a result, a firmware update is likely to be applicable to all blades having the similar configuration. However, this is not meant to be limiting. In other instances, one or more of the blades may have a different configuration than other blades sharing a chassis or a rack, for example. In this case, a given firmware update may only be applicable for targeted blades.

OOB communications under the aforementioned SMM hidden execution mode are effectuated in the following manner. First, it is necessary to switch the operating mode of the processors on the blades to SMM. Therefore, an SMI is generated to cause the processor to switch into SMM. This may be effectuated through one of two means—either an assertion of the processors SMI pin (i.e., a hardware-based generation), or via issuance of an "SMI" instruction (i.e., a software-based generation).

In one embodiment an assertion of the SMI pin may be produced by placing an appropriate signal on a management bus or the like. For example, when an SMBUS is deployed using an $I^2C$ (inter—IC (integrated circuit)) bus, one of the bus lines may be hardwired to the SMI pins of each blade's processor via that blade's connector. Optionally, the interface plane may provide a separate means for producing a similar result. Depending on the configuration, all SMI pins may be commonly tied to a single bus line, or the bus may be structured to enable independent SMI pin assertions for respective blades. As yet another option, certain network interface controller, such as those made by Intel®, provide a second MAC (Media Access Channel) address for use as a "back channel" in addition to a primary MAC address used for conventional network communications. Furthermore, these NICs provide a built-in system management feature, wherein an incoming communication referencing the second MAC address causes the NIC to assert an SMI signal. This scheme enables an OOB channel to be deployed over the same cabling as the "public" network (e.g., external network 710).

In one embodiment, a firmware driver will be employed to access the OOB channel. For instance, when the OOB channel is implemented via a network or serial means, an appropriate firmware driver will be provided to access the network or serial port. Since the configuration of the firmware driver will be known in advance (and thus independent of the operating system), the SMM handler may directly access the OOB channel via the firmware driver. Optionally, in the case of a dedicated management bus, such as $I^2C$, direct access may be available to the SMM handler without a corresponding firmware driver, although this latter option could also be employed.

In response to an assertion of the SMI pin, the asserted processor switches to SMM execution mode and begins dispatch of its SMM handler(s) until the appropriate handler (e.g., communication handler 704) is dispatched to facilitate the OOB communication. Thus, in each of the OOB communication network/channel options, the OOB communications are performed when the blade processors are operating in SMM, whereby the communications are transparent to the operating systems running on those blades.

Continuing with the flowchart of FIG. 5, a determination is made in a decision block 516 to whether the received OOB communication corresponds to a firmware update event. If it does, the event name and data packet are stored in the variable namespace in a block 518. This is generally facilitated by a Variable Services API that is published during initialization of each blade, as discussed above.

In further detail, an update handler 706 corresponding to the firmware device that is to be updated (depicted as update handlers X, Y, and Z in FIG. 6) writes data to the Variable Services component of the Runtime Services 308 via a corresponding variable services API 600. The variables data are used to perform several functions, including apprizing the system that an update is requested, identifying which update API is to be employed to facilitate the update, and providing other variable data that is employed to effect the update.

Under the Variable Services, variables are defined as key/value pairs that consist of identifying information plus attributes (the key) and arbitrary data (the value). Variables are intended for use as a means to store data that is passed between the EFI environment implemented in the platform and EFI OS loaders and other applications that run in the EFI environment. Although the implementation of variable storage is not defined in the EFI specification, variables must be persistent in most cases. This implies that the EFI implementation on a platform must arrange it so that variables passed in for storage are retained and available for use each time the system boots, at least until they are explicitly deleted or overwritten.

There are three variable service functions: GetVariable, GetNextVariableName, and SetVariable. GetVariable returns the value of a variable. GetNextVariableName enumerates the current variable names. SetVariable sets the value of a variable. Each of the GetVariable and SetVariable functions employ five parameters: VariableName, VendorGuid (a unique identifier for the vendor), Attributes (via an attribute mask), DataSize, and Data. The Data parameter later identifies a buffer (via a memory address) to write or read the data contents of the variable from. The VariableName, VendorGuid parameters enable variables corresponding to a particular system component (e.g., add-in card) to be easily identified, and enables multiple variables to be attached to the same component.

In some instances, an update may be fully effectuated via changes to configuration data for a corresponding component (e.g., firmware for a peripheral device, such as a disk drive), which are stored in an NV rewritable memory device.

This is depicted by the process flow illustrated for API Z in FIG. 6. In other instances, the update is effectuated by copying data from an update image to the NV rewritable memory device, typically but not limited to overwriting all or a portion of the memory space for the device corresponding to a current firmware image. Accordingly, in these instances the update handler will further write an update image to a memory buffer, as depicted the process flows in FIG. 6 corresponding to API's X and Y.

In general, variable data may be stored using one of several storage mechanisms, including storage in system memory, NVRAM (non-volatile RAM, e.g., a portion of a firmware device's memory space reserved for storing data), a host-protected area (HPA) of a disk drive, or even a network store 714. For example, the variable data may be stored in a memory block and a corresponding memory block descriptor is created. In one embodiment, the variable data are stored in system memory 204 in connection with the EFI System Configuration Table. More particular, memory space corresponding to the EFI System Configuration Table can be allocated for variable data storage via the InstallConfigurationTable function. For clarity, this allocated memory is identified as "Firmware Update Table" 408 in FIG. 4. The corresponding memory block descriptor comprises a GUID entry in the System Configuration Table identifying the block containing the variable data.

At this point the blades are ready for firmware updates to be implemented. Since some of the firmware is employed during runtime operations, it is generally not a good idea to perform a firmware update during operating system runtime operations with the intention of continuing those operations after the update without a reset. Accordingly, in one embodiment, the firmware update(s) for a given blade are effectuated by first resetting the blade, and then updating the firmware during subsequent initialization operations. In one embodiment, a reset request is sent to one or more blades targeted for firmware update by a management facility, such as a management console or via proxy from configuration server 708. As depicted by a decision block 520 and a continuation block 522, in response to receiving the request, a given blade is reset, returning the logic to start block 500.

In response to the reset, the operations of blocks 502 and 504 are performed in the manner discussed above. However, when the determination of decision block 506 is evaluated this time, update variables do exist, causing the logic to flow to a block 524 in which the interface (DXE API) corresponding to a first update variable is called to update the firmware. Based on additional information contained in the variable data, the update is then performed via the API. In instances in which the update merely comprises updated configuration data that may be stored in the variable data, the update is effectuated by reading the updated configuration data and writing it to the firmware device corresponding to the update API. In instances in which the update requires a larger update image, the update image is read from the memory buffer identified by the Data parameter returned from a GetVariable call and written to an appropriate portion (memory address space) of the firmware device. In general, the location of the appropriate portion may be coded into the API itself, or may be obtained via the variable data. The foregoing process is repeated for each update variable until all of the update variables are processed in accordance with a decision block 526.

It is noted that although the foregoing firmware update embodiments are discussed in the context of a blade server environment, this is not to be limiting. Each blade may be considered to be a separate platform, such as a rack-mounted server or a stand-alone server, wherein power management of a plurality of platforms may be effectuated via an OOB channel in a manner similar to that discussed above. For example, in a rack-mounted server configuration cabling and/or routing may be provided to support an OOB channel using Intel® NICs that support backchannel operations. Thus, the firmware update process enables firmware to be updated across multiple computer platforms using a single administrative action (issuance of the update directive). This greatly simplifies the workload for IT administrators when compared with conventional practices for updating firmware for the same platforms.

Also as discussed above, the firmware update scheme is effectuated, at least in part, through firmware stored on each blade or platform. The firmware, which may typically comprise instructions and data for implementing the various operations described herein, will generally be stored on a non-volatile memory device, such as but not limited to a flash device, a ROM, or an EEPROM. The instructions are machine readable, either directly by a real machine (i.e., machine code) or via interpretation by a virtual machine (e.g., interpreted byte-code). Thus, embodiments of the invention may be used as or to support firmware executed upon some form of processing core (such as the processor of a computer) or otherwise implemented or realized upon or within a machine-readable medium. A machine-readable medium includes any mechanism for storing or transmitting information in a form readable by a machine (e.g., a processor). For example, a machine-readable medium can include media such as a read only memory (ROM); a random access memory (RAM); a magnetic disk storage media; an optical storage media; a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for updating firmware for a plurality of computing platforms, comprising:
   transmitting an update directive to a first computing platform of said plurality of computing platforms, said update directive including firmware update data;
   receiving the update directive at the first computing platform;
   broadcasting the firmware update data from the first computing platform to other computing platforms from among the plurality of computer platforms via an out-of-band ("OOB") communication channel, wherein said broadcasting is initiated responsive to receiving the update directive; and updating firmware on each of the plurality of computing platforms through use of the firmware update data.

2. The method of claim 1, wherein the method is performed in a manner that is transparent to operating systems running on the plurality of computing platforms.

3. The method of claim 1, wherein the method is facilitated by firmware running on each of the plurality of computing platforms.

4. The method of claim 1, wherein updating the firmware using the firmware update data includes:
providing at least one programmatic interface to facilitate update of firmware corresponding to a computing platform or a computer platform component; and
employing said at least one programmatic interface in connection with performing an update of the firmware for the computer platform or computer platform component.

5. The method of claim 4, wherein the method is performed in accordance with the extensible firmware interface (EFI) framework, and said at least one programmatic interface includes a variable services programmatic interface corresponding to runtime services provided by the EFI framework that is used to interface with the update application.

6. The method of claim 5, wherein said at least one programmatic interface further includes a programmatic interface published by an EFI firmware driver.

7. The method of claim 6, wherein the programmatic interface published by the EFI firmware driver is specific to the platform component for which firmware is updated and provides direct access to a firmware device on which the firmware for the platform component is stored.

8. The method of claim 1, wherein the firmware update is performed via a two-phase process including a first phase that is performed during an operating system runtime phase and a second phase that is performed during a platform initialization phase.

9. The method of claim 8, wherein the second phase is commenced by automatically causing a warm reset for each of the plurality of computing platforms after the first phase is completed.

10. The method of claim 8, wherein the firmware is updated by performing operations comprising:
storing the firmware update data during the operating system runtime phase;
retrieving the update data during the platform initialization phase; and
employing a firmware component identified by the firmware update data to effectuate the firmware update.

11. The method of claim 10, wherein the firmware component provides an interface for directly accessing a firmware device on which the firmware to be updated is stored.

12. The method of claim 1, wherein the OOB communication channel comprises at least one of a system management bus, an Ethernet-based network, and a serial communication link.

13. The method of claim 1, wherein the plurality of computing platforms comprise a plurality of server blades operating in a blade server environment.

14. The method of claim 13, wherein a firmware upgrade is implemented across one of group of server blades, an individual blade server chassis, a plurality of blade server chassis, a blade server rack, and a plurality of blade server racks.

15. A method for updating firmware across a plurality of server blades, comprising:
transmitting an update directive containing firmware update data to a first server blade;
receiving the update directive at the first server blade;
broadcasting the firmware update data from the first server blade to other server blades via an out-of-band (OOB) communication channel, wherein said broadcasting is initiated responsive to receiving the update directive; and
updating firmware on each of the plurality of server blades through use of the firmware update data.

16. The method of claim 15, wherein the update directive is issued from a configuration server coupled to the plurality of server blades via an external network.

17. The method of claim 15, wherein the method is facilitated by firmware stored on each of the plurality of server blades.

18. The method of claim 15, wherein the method is performed in a manner that is transparent to operating systems running on the plurality of server blades.

19. An article of manufacture comprising a tangible machine-readable medium having instructions stored thereon, which when executed on a computing platform causes the computing platform to perform operations including:
set up access to an out-of-band (OOB) communication channel that operates transparently from an operating system to be run on the computing platform;
receive an update directive containing firmware update data at the first computing platform;
broadcast the firmware update data from the first computing platform to other computing platforms via the OOB communication channel, wherein the broadcast is initiated responsive to receipt of the update directive; and
update firmware on the computing platform through use of the firmware update data.

20. The article of manufacture of claim 19, wherein the instructions comprise firmware instructions.

21. The article of manufacture of claim 20, wherein the article comprises a flash device.

22. The article of manufacture of claim 20, wherein the operations are performed in a manner that is transparent to an operating system running on the computing platform.

23. The article of manufacture of claim 19, wherein the computing platform comprises a server blade.

24. A blade server system, comprising:
a chassis, including a plurality of slots in which respective server blades may be inserted;
an interface plane having a plurality of connectors for mating with respective connectors on inserted server blades and providing communication paths between the plurality of connectors to facilitate an out of band (OOB) communication channel; and
a plurality of server blades, each including a processor and firmware executable thereon to cause that server blade to perform operations including:
set up access to an out-of-band (OOB) communication channel that operates transparently from an operating system to be run on the computing platform;
receive an update directive including firmware update data;
broadcast the firmware update data from the computing platform to other computing platforms via the OOB channel responsive to receipt of the update directive; and update firmware on the computing platform through use of the firmware update data.

25. The blade server system of claim 24, further comprising a management card coupled to the interface plane.

26. The blade server system of claim 24, wherein the operations are performed in a manner that is transparent to operating systems that may be run on the plurality of server blades.

27. The blade server system of claim 26, wherein each processor supports a hidden execution mode that is employed for facilitating communication via the OOB channel.

28. The blade server system of claim 24, wherein the OOB channel comprises an I2C (inter-IC (integrated circuit)) bus.

* * * * *